US006367866B1

(12) United States Patent
Moore

(10) Patent No.: US 6,367,866 B1
(45) Date of Patent: Apr. 9, 2002

(54) PARTIALLY SUBMERGEABLE TRAILER FOR TRANSPORTING AND STORING WATERCRAFT

(76) Inventor: Charles Edward Moore, 4018 Southbrook Ct., Kennesaw, GA (US) 30152

( * ) Notice: Subject to any disclaimer, the term of this patent is extended or adjusted under 35 U.S.C. 154(b) by 0 days.

(21) Appl. No.: 09/660,799

(22) Filed: Sep. 13, 2000

(51) Int. Cl.[7] .................................................. B60J 7/00
(52) U.S. Cl. ..................... 296/181; 280/414.1; 114/344
(58) Field of Search ........................... 296/181, 100.06, 296/100.1, 157, 26.04, 26.06; 280/414.1, 414.2; 114/344

(56) References Cited

U.S. PATENT DOCUMENTS

| | | | | |
|---|---|---|---|---|
| 4,243,242 A | * | 1/1981 | Waits ........................ 280/414.1 |
| 4,767,132 A | | 8/1988 | Avery ........................ 280/414.1 |
| 4,781,392 A | * | 11/1988 | Cooper ...................... 280/414.1 |
| 4,869,545 A | * | 9/1989 | Noternmann ................ 296/157 |
| 4,934,302 A | * | 6/1990 | Harper ...................... 280/414.1 |
| 4,960,356 A | | 10/1990 | Wrenn ........................ 414/537 |
| 4,982,971 A | * | 1/1991 | Marin ....................... 296/181 X |
| 5,058,946 A | | 10/1991 | Faber ........................ 296/181 |
| 5,119,752 A | | 6/1992 | Doherty ..................... 114/382 |
| 5,249,545 A | | 10/1993 | Gettman .................... 114/259 |
| 5,549,438 A | | 8/1996 | Dwyer et al. ............... 414/559 |
| 5,681,074 A | * | 10/1997 | Christensen ............... 296/181 |
| 5,722,809 A | | 3/1998 | Urbank ...................... 414/529 |
| RE36,567 E | | 2/2000 | Godbersen ............... 280/414.1 |
| 6,082,809 A | * | 7/2000 | Edgellar et al. ............ 296/181 |
| 6,186,580 B1 | * | 2/2001 | Nothem et al. ............ 296/181 |

* cited by examiner

Primary Examiner—Stephen T. Gordon
Assistant Examiner—Patricia Engle
(74) Attorney, Agent, or Firm—Troutman Sanders LLP; Wm. Brook Lafferty

(57) ABSTRACT

A partially submergible, covered trailer for launching and landing watercraft from the sides or the rear of the covered trailer. The covered trailer includes a lower shell and an upper shell formed to mate with one another. The lower and upper shells define an interior for receiving and retaining personal watercraft. The upper shell is permitted to move between an elevated position and a lowered position relative to the lower shell. While the upper shell is in the elevated position, access is provided to the interior of the covered trailer from the rear and sides of the covered trailer.

20 Claims, 3 Drawing Sheets

PARTIALLY SUBMERGEABLE TRAILER FOR TRANSPORTING AND STORING WATERCRAFT

TECHNICAL FIELD

The present invention relates to trailers for watercraft and, more particularly, relates to a trailer permitting access from the rear and sides while partially submerged.

BACKGROUND OF THE INVENTION

There are numerous types of trailers available for transporting and launching watercraft. However, most of these known trailers are primarily designed for transporting the watercraft and not for storage of the watercraft. Because most watercraft owners do not use their watercraft year round, their watercraft then often sit outside unprotected from the elements. Often, some watercraft owners store their trailer and watercraft in their garage to protect the watercraft from the elements.

There are some covered trailers available for storing personal watercraft. However, these known covered trailers are limited in their ability to permit launching and landing of watercraft while in the water. Because of the vertical sides and often the top of the covered trailer, these known covered trailers only permit landing of personal watercraft directly from the rear of the covered trailer.

Therefore, there is a need for a more versatile covered trailer for watercraft. This new covered trailer must permit access from the sides of the trailer, while the covered trailer is partially submerged, for launching and landing the personal watercraft.

SUMMARY OF THE INVENTION

The present invention solves the above-identified problems by providing a covered trailer having separable shells. Portions of the sides of the trailer are raised for permitting greater access when launching and landing the trailer from the rear.

Generally described, the present invention includes a lower shell and an upper shell. The upper and lower shells are formed to mate with one another. Between the upper and lower shells is defined an interior for receiving and retaining the personal watercraft. The invention further includes a means for permitting the upper shell to move between an elevated position and a lowered position. Access is permitted to the interior of the trailer from the rear and sides of the trailer when the upper shell is in the elevated position.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

Similar reference characters refer to similar parts throughout the several views of the drawings.

DETAILED DESCRIPTION

With reference to the drawings, a new covered trailer for transporting and storing watercraft embodying the principles and concepts of the present invention and generally designated by the reference number 10 will be described.

Figure 1:
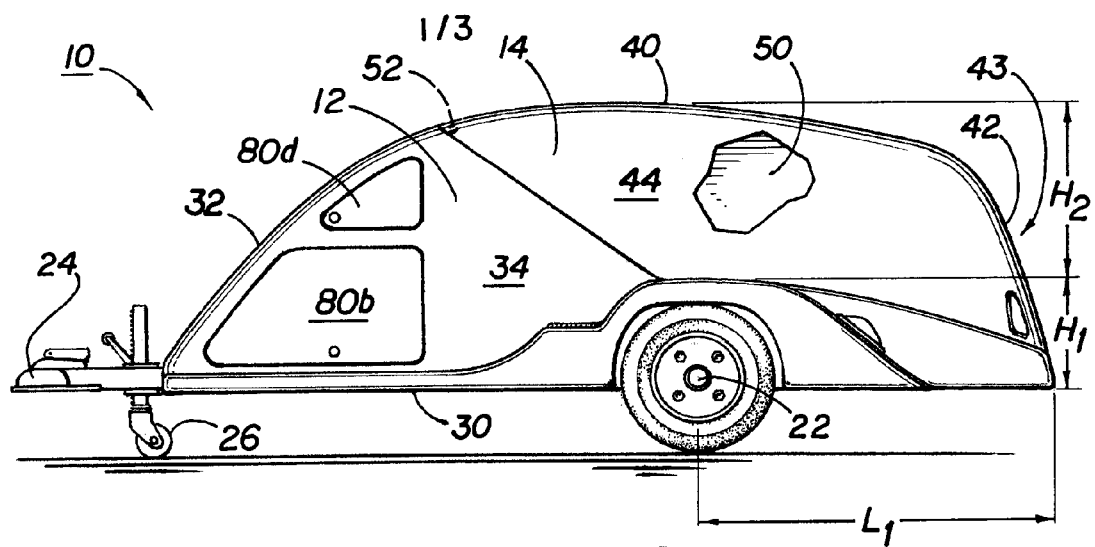
FIG. 1 illustrates a side view of one embodiment of the trailer of the present invention.
Figure 2:
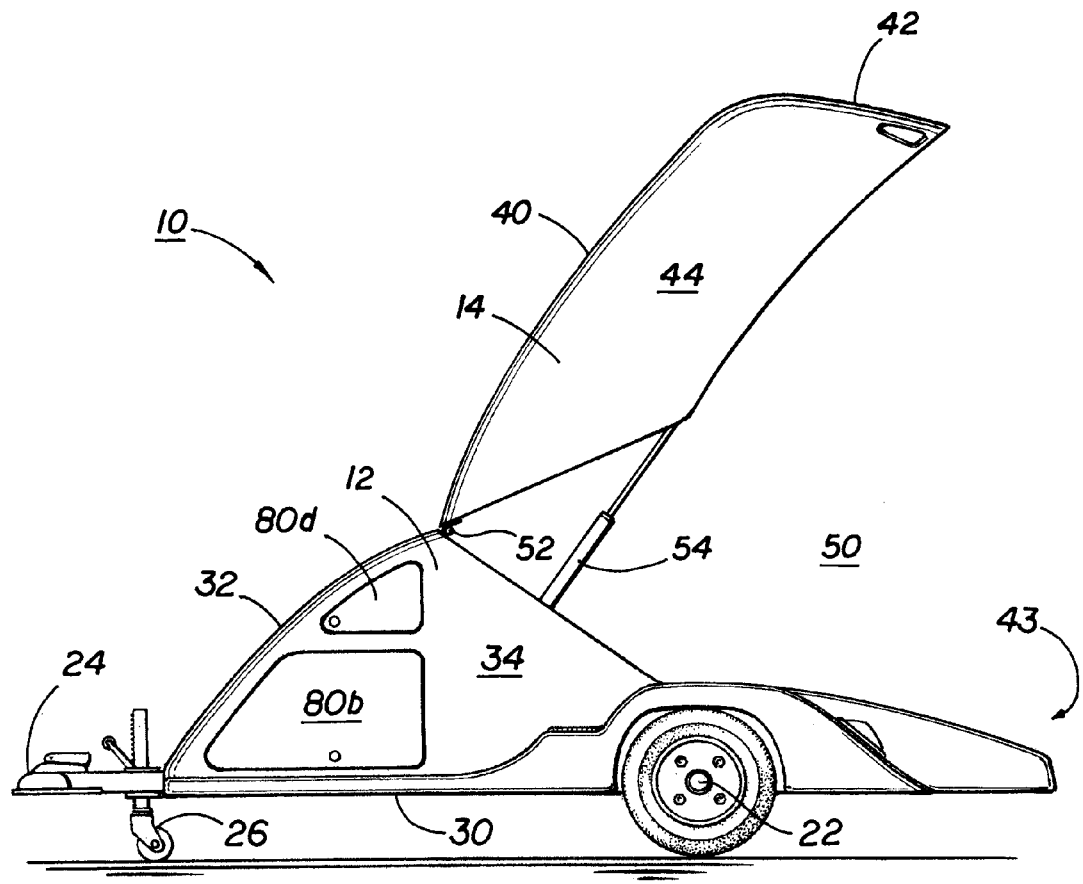
FIG. 2 illustrates a side view of the trailer of FIG. 1 having an upper shell in an elevated position.

FIGS. 1 and 2 illustrate one embodiment of the covered trailer 10 of the present invention. The covered trailer 10 includes a lower shell 12 and an upper shell 14. The 12, 14 shells are attached to a frame 20. The frame 20 includes at least one wheeled axle 22, a trailer hitch 24 and a third wheel 26. The lower and upper shells 12, 14 are attached to the frame 20 above the axle 22 and behind the hitch 24 and third wheel 26 in a manner known in the art.

The lower shell 12 includes a bottom 30, a front end 32, and opposite side walls 34 extending upward from the bottom 30. The upper shell 14 includes a top 40, a rear end 43, and opposite side walls 44 extending downward from the top 40. The lower and upper shells 12, 14 are formed to mate with one another and define an interior 50 therebetween. The side walls 34, 44 or each shell 12, 14 have a variable height. Preferably, the height of the side walls 34 of the lower shell is the smallest near a rear end 43 of the trailer 10 and the height of the side walls 44 of the upper shell is the greatest near the rear end 43 of the trailer 10 as explained in greater detail below.

Preferably, the height of the side walls 34 of the lower shell is the smallest near a rear end 43 of the trailer 10 and the height of the side walls 44 of the upper shell is the greatest near the rear end 43 of the trailer 10 as explained in greater detail below.

The upper shell 14 is permitted to move relative to the lower shell 12 between an elevated position and a lowered position. FIG. 1 illustrates the upper shell 14 lowered into the lowered position and FIG. 2 illustrates the upper shell 14 elevated into the elevated position. Preferably, a pivoting connector or a hinge 52 is used to attach the lower and upper shells 12, 14 together in a movable manner. A piston 54 is used to hold the upper shell 14 in the elevated position as shown in FIG. 2. Elevating the upper shell 14 into the elevated position opens the rear and at least a portion of the sides of the trailer 10 to expose the interior 50 and provide access to the interior 50 from the rear and sides of the trailer 10. Because the watercraft operator can ride the watercraft onto the trailer 10 from the rear end 43 of the trailer 10, greater access is needed overhead and on the sides. In the lowered position, the rear and sides of the trailer are closed and the watercraft are fully enclosed in the trailer 10.

Preferably, the lower and upper shells 12, 14 conform to the shape of at least one watercraft. As best shown in FIGS. 1–4, the trailer 10 can accommodate two watercraft in a side by side manner in the interior 50. The interior 50 is divided into two separate areas 55 and 56 as best shown in FIG. 4. The front end 32 of the lower shell 12 tapers down to the bottom 30 to provide aerodynamics to the trailer 10 while also conforming the shape of the interior 50 to the watercraft.

Portions of the opposite side walls 34 of the lower shell 12 are configured to be submerged when the trailer 10 is backed into the water. Preferably, the submergible portions of the lower shell 12 are behind the axle 22 and at least in the immediate proximity of the rear end 43. When the trailer 10 is partially submerged in the water, the opposite side walls 44 of the upper shell 14 remain above the water. The opposite side walls 34, 44 of both the lower and upper shells 12, 14 are displaced apart from one another a distance sufficient to permit the watercraft and operator to pass therebetween when the trailer 10 is partially submerged. Moreover, the submergible portion of the lower shell 12 of the trailer 10 near the rear end 43 is sized to be submerged in the water a sufficient distance to permit the owner to pass over the side walls 34. As best shown in FIG. 1, the submergible portions of the opposite side walls 34 of the lower shell 12 preferably have a length $L_1$ greater than a height $H_1$. Also, a portion of each of the opposite side walls of the upper shell near the rear end 43 preferably have a height $H_2$ greater than the height $H_1$ of the opposite side walls of the lower shell 12. The larger height $H_2$ of the upper shell 14 accommodates for the smaller height $H_1$ of the lower shell when the shells are mated together.

Figure 5:
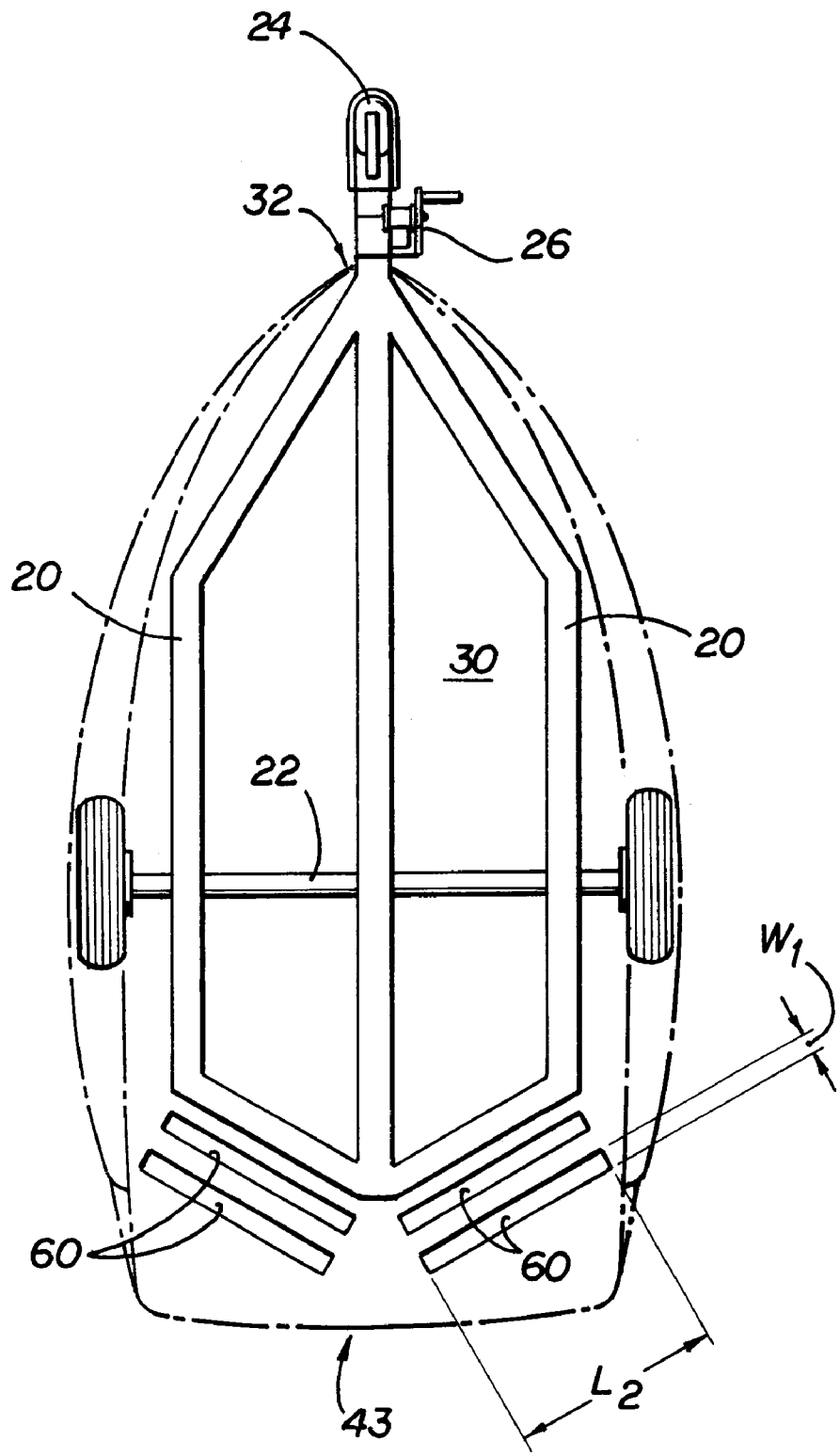
FIG. 5 illustrates a top view of one embodiment of a bottom of the trailer of FIGS. 1 and 2.

The bottom of the lower shell 12 includes a plurality of openings 60 adapted for permitting water to pass therethrough when the trailer 10 is partially submerged in water. However, the openings 60 are sized small enough to prevent debris from entering the interior 50 of the trailer 10 when transporting and storing the watercraft. Preferably, the openings 60 are substantially slot-shaped having a length $L_2$ longer than a width $W_1$ and are positioned substantially diagonally relative to the front end 32 and opposite side portions 34 of the lower shell 12. As shown in FIG. 5, the openings 60 are displaced from one another in an equidistant manner in the proximity of the rear end 43. This configuration and orientation of the openings 60 expels the most water when pulling out of the water while also obstructing the most debris while traveling.

The lower shell 12 may further include dry compartments 70. Because the side walls 34 of the lower shell 12 are larger near the front end 32 compared to the size of the side walls 34 of the lower shell 12 in the proximity of the rear of the trailer, dry stowage is available at the front of the trailer 10. The dry compartments 70 are preferably positioned in the proximity of the front end 32 because the front end is never submerged. The dry compartments 70 may be used for equipment stowage such as batteries 72 and winches 74 to load watercraft as shown in FIG. 4. A battery charger/heater 76 may also be included.

Figure 3:
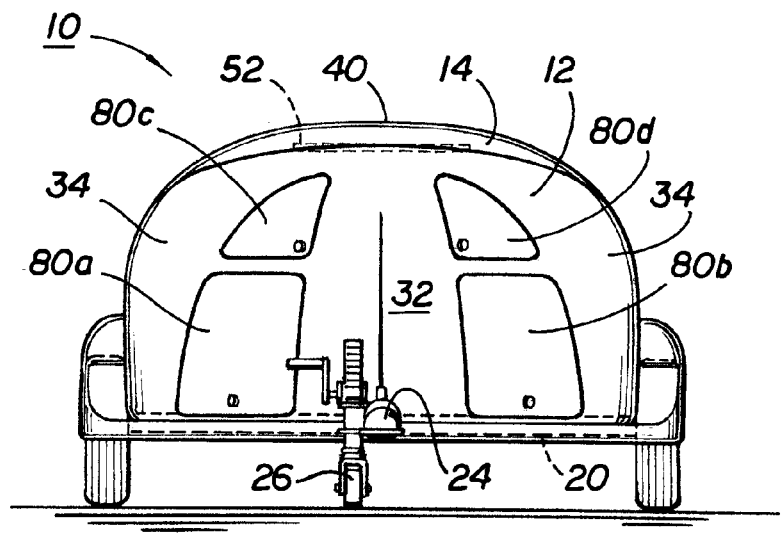
FIG. 3 illustrates a front view of the trailer of FIGS. 1 and 2 in the closed position.
Figure 4:
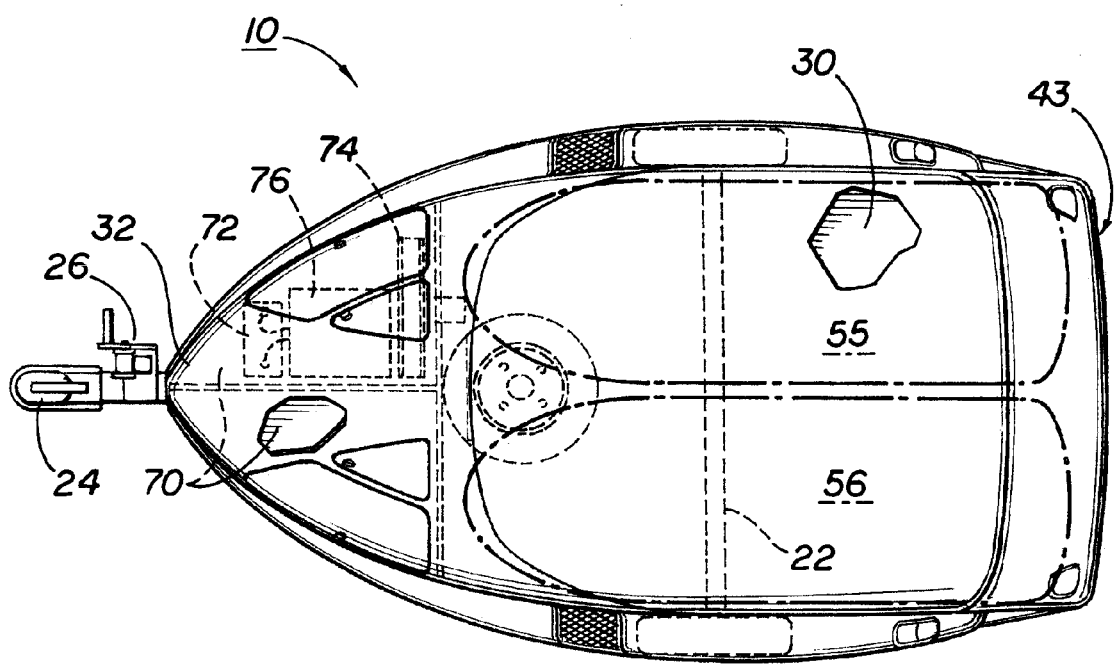
FIG. 4 illustrates a top view of the trailer of FIGS. 1 and 2.

As best shown in FIG. 3, the front end 32 of the trailer 10 may include a plurality of doors 80a–d. Doors 80a and 80b may be used to access the dry stowage behind the front end 32 in the lower shell 12 and doors 80c and 80d may be used to access the winches 74. The winches 74 are preferably mounted in the lower shell 12 in a side by side manner to allow watercraft to be received and retained in the trailer 10 in substantially a side by side manner.

The use of the covered trailer 10 as described above constitutes an inventive method of the present invention in addition to the covered trailer 10 itself. In practicing the method of launching and landing watercraft from the rear or either side of the covered trailer 10, the steps include elevating an upper shell 14 relative to a lower shell 12 of the trailer 10 as described above. The method then includes the step of partially submerging the trailer 10 in water. Next, the method includes the step of portions of opposite side walls 34 of the lower shell 12 becoming submerged in the water while the opposite side walls 44 of the upper shell 14 remain free of the water.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A covered trailer comprising:
   a lower shell and an upper shell formed to mate with one another to define an interior therebetween for receiving and retaining a personal watercraft, said lower shell comprising a bottom, front end, and opposite side walls;
   means for permitting said upper shell to move relative to said lower shell between an elevated position and a lowered position, said trailer permitting access to said interior from the rear and sides of said trailer when said upper shell is in said elevated position; and
   a plurality of openings adapted for permitting water to pass therethrough when said trailer is partially submerged in water and to protect said interior from debris when said trailer is other than partially submerged in water, wherein said openings are substantially slot-shaped having a length longer than a width.

2. The trailer of claim 1 wherein said openings are positioned substantially diagonally relative to said front end and said opposite side walls of said lower shell.

3. A covered trailer comprising:
   a lower shell and an upper shell formed to mate with one another to define an interior therebetween for receiving and retaining a personal watercraft, said lower shell comprising a bottom, front end, and opposite side walls; and
   means for permitting said upper shell to move relative to said lower shell between an elevated position and a lowered position, said trailer permitting access to said interior from the rear and sides of said trailer when said upper shell is in said elevated position,
   wherein said upper shell comprises a rear end, and wherein said bottom comprises a plurality of openings adapted for permitting water to pass therethrough when said trailer is partially submerged in water and adapted to protect said interior from debris when said trailer is other than partially submerged in water, said openings laterally displaced from one another in an equidistant manner and positioned in the proximity of said rear end.

4. The trailer of claim 3 wherein said front end of said lower portion gradually tapers down to said bottom.

5. The trailer of claim 3 wherein a portion of each said opposite side wall of said lower shell has a length greater than a height.

6. The trailer of claim 3 wherein said upper shell comprises [a rear end and] opposite side walls.

7. The trailer of claim 3 wherein each said opposite sidewall of said upper shell has a height greater than a height of a portion of each of said opposite side walls of said lower shell.

8. The trailer of claim 3 wherein said lower shell has a height which decreases relative to the distance from said front end.

9. The trailer of claim 3 further comprising at least one wheeled axle.

10. The trailer of claim 3 wherein said means for permitting said upper shell to move comprises a hinge.

11. The trailer of claim 3 further comprising a trailer hitch.

12. The trailer of claim 3 further comprising at least one winch to load the watercraft into said trailer.

13. The trailer of claim 12 comprising two said winches, said winches positioned in said lower shell such that a pair of watercraft may be received and retained in said trailer in substantially a side by side manner.

14. The trailer of claim 3 wherein said interior defines two separate areas for receiving watercraft side by side, each said area configured for retaining one of said watercraft.

15. The trailer of claim 3 wherein said lower and upper shells generally conform to the shape of at least one watercraft.

16. The trailer of claim 3 wherein a portion of each said opposite side wall of said lower shell has a length greater than a height.

17. The trailer of claim 3 wherein opposite side wall portions of said upper shell have a height greater than a height of opposite side wall portions of said lower shell.

18. The trailer of claim 3 wherein a portion of an opposite side wall of said lower shell is configured to be submerged in water when said trailer is partially submerged in water and opposite side walls of said upper shell remaining above the water when said trailer is partially submerged.

19. The trailer of claim 3 further comprising at least one dry compartment in said lower shell.

20. A trailer for towing personal watercraft comprising:

a lower shell comprising a bottom, front end, and opposite side walls, said bottom comprising a plurality of openings adapted for permitting water to pass therethrough when said trailer is partially submerged in water, a portion of each said opposite side wall of said lower shell having a length greater than a height;

an upper shell comprising a rear end and opposite side walls, said upper shell formed to mate with said lower shell to define an interior therebetween, said opposite side walls of said upper shell having a height greater than said height of said portions of said opposite side walls of said lower shell, said lower and upper shells generally conforming to the shape of at least one watercraft, and said portions of said opposite side walls of said lower shell configured to be submerged in water when said trailer is partially submerged in water and said opposite side walls of said upper shell remaining above the water when said trailer is partially submerged; and a hinge for permitting said upper shell to move relative to said lower shell between an elevated position for opening said trailer to expose said interior and a lowered position for closing said trailer, said trailer permitting access to said interior from the rear and sides of said trailer when said upper shell is in said elevated position.

* * * * *